Jan. 31, 1967  K. H. BURGIN  3,301,332
TRACK LAYING CULTIVATOR FENDER
Filed Feb. 1, 1965  3 Sheets-Sheet 2
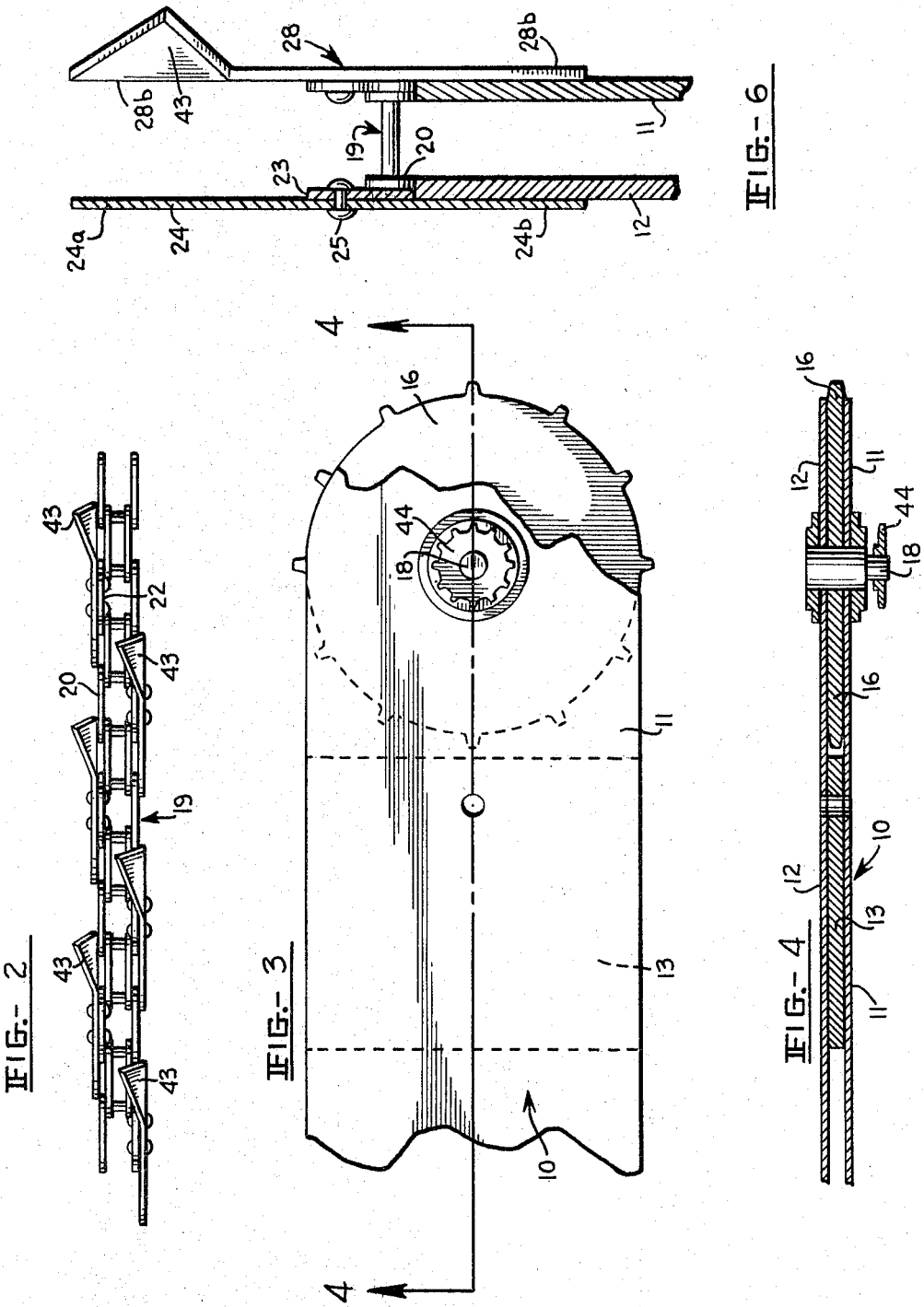
INVENTOR
KERMIT H. BURGIN
BY Herbert G. Minturn
ATTORNEY

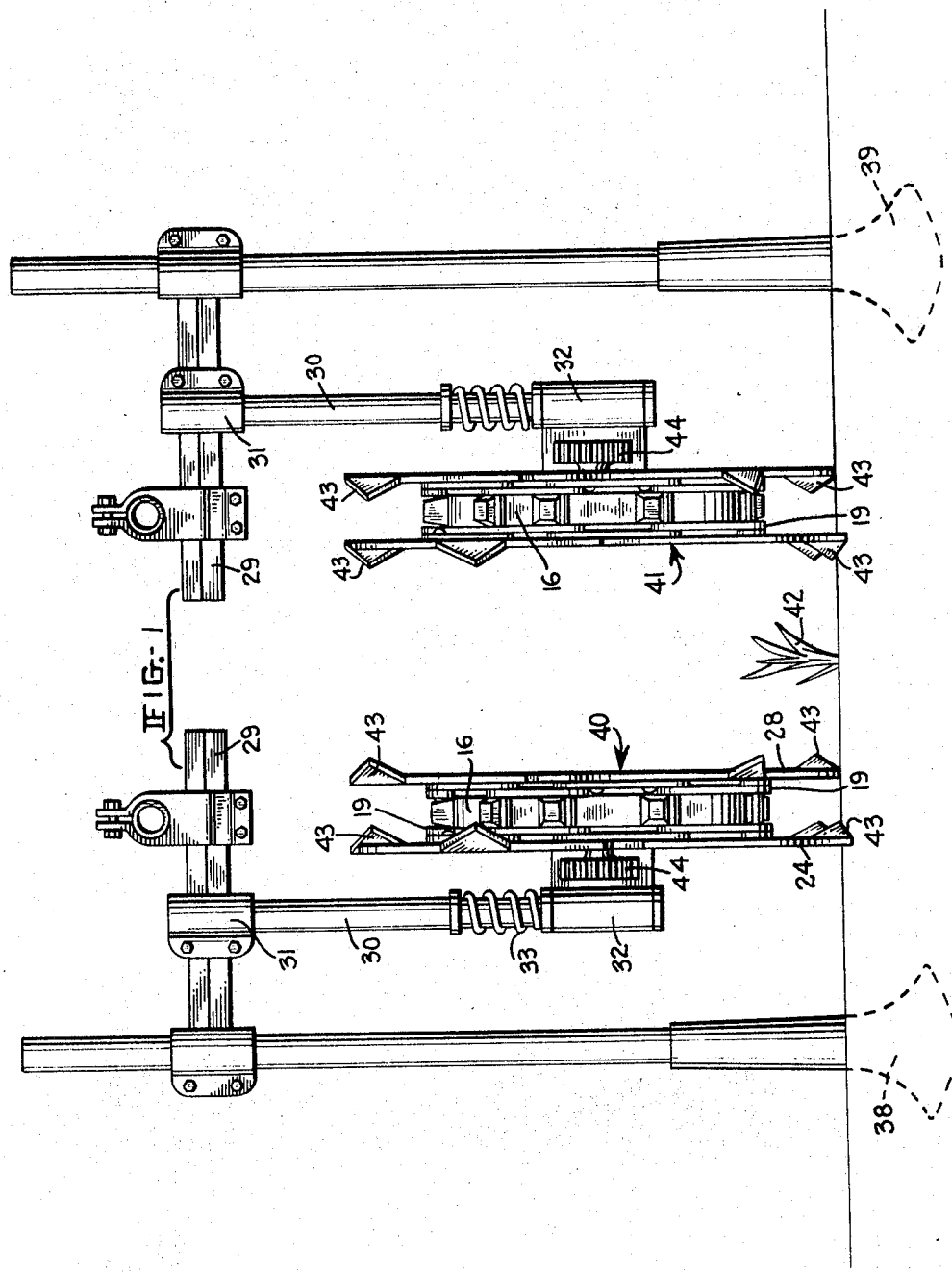

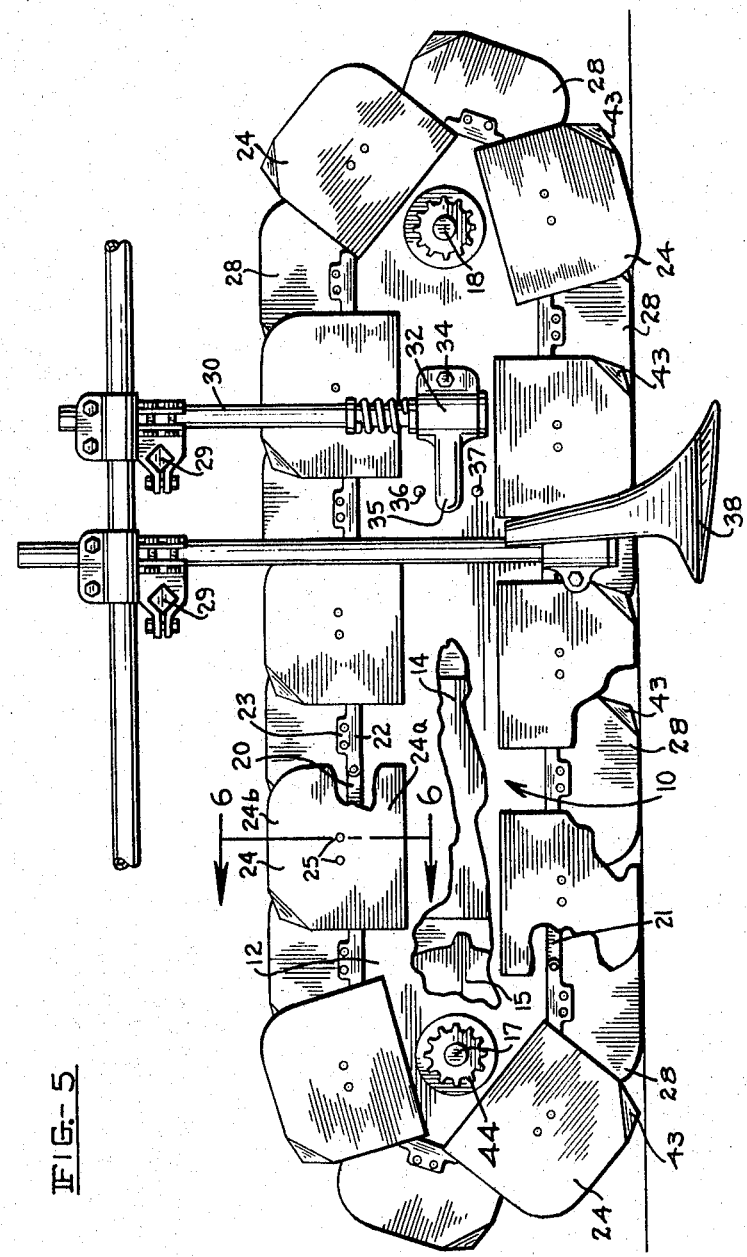

United States Patent Office 3,301,332
Patented Jan. 31, 1967

3,301,332
TRACK LAYING CULTIVATOR FENDER
Kermit H. Burgin, R.R. 1, Box 212, Boone County, near Whitestown, Ind. 46075
Filed Feb. 1, 1965, Ser. No. 429,575
7 Claims. (Cl. 172—509)

This invention presents a new approach in cultivator fenders generally employed to fend off dirt and clods moved by shovels on a cultivator device in order to prevent covering small plants aligned in rows. The invention embodies a track carrying and laying structure wherein the track is endless and wraps around two sprockets, one placed a distance from the other. The sprockets are rotatably carried at ends of a frame in turn carried by a cultivator. There are two frames with tracks, the frames being adjustably spaced apart to straddle the crop row. Where the cultivator is designed to straddle a number of rows, there will be a pair of these track carrying frames for each crop row. The frames, generally planar, will be directed in the line of cultivator travel.

The chain in each instance is trained around spaced sprockets carried by the frame to define upper and lower flights. Each chain carries a plurality of vanes throughout its length, each vane having a portion extending downwardly from the chain lower flight. The lower edges of these vanes normally bear on the ground below the frame. As the cultivator may be advanced over a field, the vanes come around the forward sprocket and downwardly into ground contact. Then the frame in each instance is carried forwardly by reason of its attachment to the cultivator and allows the ground contacting vanes to remain relatively stationary. As this frame is carried forwardly, one vane after another is picked up at the rear of the frame by reason of the chain being pulled upwardly, around and over the rear sprocket, to the end that the vanes then are inverted with their normally ground contacting edges being directed upwardly in the upper flight as the vanes are carried to the forward sprocket and then pulled around thereover and carried downwardly to come again into ground contact, which contact is sufficient to permit the advancement of the frame and its sprockets forwardly of the stationary vanes.

In this general manner, soil loosened and lifted by the cultivator shovels adjacent the crop row will only be thrown or moved to that row as the closeness thereto of the vanes permit. While in some soil and lack of ground trash instances, vanes secured along one side of the chain may be sufficient to prevent covering and smothering the row plants but better results may be obtained by mounting vanes on both sides of the chains to provide for a clearance space between two rows of ground contacting vanes.

This is particularly true when weed and corn stalks are encountered, such stalks being normally dragged along by the heretofore customary blade fender pulled along in intended sliding contact with the ground. In this dragging action the stalks and trash pile up ahead of and under these sliding fenders with the result that the stalks particularly bridge across the crop row and drag dirt therealong with the result that the plants are completely covered. The present invention provides that the forward end, down coming vanes bear down on the stalks and hold them stationary in the absence of a stalk moving or dragging action.

This is one of the primary advantages of the invention.

Another primary advantage is found in that the vanes may be brought closer to the plants in a row to permit more fine soil being brought into the row to cover grass and weeds. Moreover, clods lifted by the cultivator shovels will tend to be crushed or broken by reason of the peculiar formation of the ground contacting portions of the vanes as will be described below.

Where crop and soil conditions may permit, beneficial results may be had by power driving of the chains to cause the vanes to travel relative to the ground at a rate exceeding the travel of the cultivator to set up a thorough pulverizing of the shovel loosened soil, or in the absence of shovels, loosen the soil.

Also, the invention structure may be carried at positions to space the lower edges of the blades somewhat above ground level to permit soil to sift past the two rows of blades under edges at each side of the crop row. In this instance, the chains would be power driven, since the holding contact with the ground would be absent.

A description of one embodiment of the invention as now best known to me is made in reference to the drawings, in which FIG. 1 is a more or less diagrammatic view in front elevation of a structure embodying the invention as mounted on fragments of a cultivator frame;

FIG. 2 is a top plan view of a portion of an upper flight of a chain carrying fender blades;

FIG. 3 is a fragmentary view in side elevation of a front end of a chain carrying frame;

FIG. 4 is a view in longitudinal section on the line 4—4 in FIG. 3;

FIG. 5 is a view in side elevation of the structure, with side portions broken away, embodying the invention and as mounted on a cultivator frame fragment; and FIG. 6 is a view in transverse section on the line 6—6 in FIG. 5.

A frame generally designated by the numeral 10 is constructed to have two side plates 11 and 12 with separator blocks 13 engaged therebetween, one toward each end. The blocks 13 and 14 in each instance serves to space apart the side plates 11 and 12 a sufficient distance to receive rotatably therebetween sprocket wheels 15 and 16. The blocks 13 and 14 terminate between and within the outer ends of the side plates 11 and 12 short of the sprocket wheels 15 and 16.

The sprocket wheels 15 and 16 are carried on cross shafts 17 and 18 carried by the sides plates 11 and 12. An endless link chain generally indicated by the numeral 19 is trained around the two sprockets 17 to have upper and lower flights 20 and 21. Every second chain side plate 22, along one side of the chain, has an outwardly extending portion 23 to which is secured a blade 24 herein shown as by rivets 25. These blades 24 extend at approximately right angles in both directions to the general direction of chain flight to overlap the sideplate 12 by one portion 24a and to extend by the opposite portion 24b freely beyond the chain 19. In like manner, every second sideplate 26 on the opposite chain side has the outwardly extending portion 27, to which is attached a blade 28 having the same dimensions as those of the blade 24. These blades with one portion 28a overlapping the other frame sideplate 11 and another portion 28b extend oppositely and freely in approximate parallelism with the portion 24b. The second chain side plate 26 is not opposite a sideplate 22 but is staggered in relation thereto to be one link ahead or behind.

By reason of the staggered chain sideplates 22 and 26, the blades 24 and 28 will overlap each other though spaced laterally apart by the general width of the chain 19, the blades 24 on one side having their opposing ends intermediate the ends of a blade 28 on the other side, FIG. 5.

The frame 10 is adjustably supported from some member 29, FIGS. 1 and 5, of a cultivator not shown in its entirety. There is in the present form, a post 30 adjustably fixed by its upper end portion by a clamp 31 of a structure well known to those familiar in the art, whereby the post 30 may be adjusted vertically and also be adjustably shifted along the member 29 to vary the spacing apart of the post carried frames 10. The post 30 in each instance extends approximately vertically through a frame carried bracket 32. The post 30 has an abutment on its lower end on which abutment, the bracket 32 normally bears. A coil spring 33 surrounds the post 30 above the bracket 32 and compressively bears between the top of the bracket and an abutment 34 fixed on the post 30. Lifting of the bracket 32 therefore is resisted yieldingly by this spring 33.

The bracket 32 bears by a side against the frame plate 11 in one instance and is rockably supported and held there against by the pin 34, FIG. 5 whereby the frame 10 may rock on the pin 34. This frame rocking is limited by an arm 35 fixed to the bracket 32 and extending between two spaced abutments 36 and 35 fixed to the frame 10. The bracket 32 is located near what is the forward end of the frame 10, the forward end being located in respect to forward travel of the cultivator.

There will be two of the structures as above described, one for each side of a crop row. Each structure may be termed a fender 40 and 41 respectively.

When the posts 30 may be lifted by the cultivator such as in carrying the fenders 40 and 41 above the ground, the rear ends of the fenders will tend to drop since the fenders are overbalanced to the rear on the pins 34, but the drop will be limited by the pins 36 striking the arms 35.

There will normally be cultivator carried shovels 38 and 39, one each adjacent the outer sides of the fenders 40 and 41 as illustrated in FIG. 1. These shovels 38 and 39 may be adjustable, both vertically and also laterally relative to the fenders and to the crop row whereby the proper amount of soil is loosened and moved toward the row plant 42 as may be limited by the positions of the fenders 40 and 41.

Each of the blades 24 and 28 is provided with a corner deflector 43 at the corner last coming into ground contact, FIG. 5. The deflectors 43 on all blades will extend toward the row plant 42. As these deflectors 43 come down against the ground, clods appearing in their paths will be crushed. Also, if trash appears in the paths of these deflectors 43, they will come to press the trash against the ground to hold the trash stationary and thereby against dragging. In the event the chains of the fenders are power driven, these deflectors 43 will serve to pulverize as well as gently move the soil toward the crop row.

The fender chains 19 may be driven in each fender by a sprocket 44 fixed on the shaft 18 in turn rotating the sprocket 16. The sprocket 44 may be driven from any suitable power source (not shown) carried by the cultivator and not per se forming a part of the invention. The term belt employed herein is intended to include chain, fabric, cable, or the like material.

While I have shown and described my invention in the one precise form, I do not desire to be limited to that form beyond the limitations which may be imposed by the following claims.

I claim:
1. A cultivator fender for controlling flow of soil toward a crop row, comprising a frame;
an endless belt shiftably carried and guided around the frame through upper and lower flights;
a series of vanes fixed one after another to and along one side of said belt and extending beyond the belt in an approximately vertical plane, the vanes along the lower flight extending downwardly from the belt, and the vanes along the upper flight extending upwardly from the belt;
means supporting said frame from the cultivator to position one or more vanes on the under flight in contact with the soil;
said vane contact with the soil being temporarily stationary and inducing travel of the belt around said frame under forward travel of the cultivator as said frame travels accordingly with the cultivator; and
said belt travel picking up successively a rear most vane of the stationary ones and lowering a foremost vane coming from the upper belt flight into soil contact ahead of the intermediate stationary vanes.
2. The structure of claim 1, in which
there is an ear projecting from each of said vanes at its lowermost forward portion with respect to the vanes positioned in soil contact.
3. The structure of claim 2, in which
said ears are directed from the vanes toward the crop row tending to lift soil toward the row as the vanes are lifted from ground contact.
4. The structure of claim 1, in which there is
a second series of vanes secured to said belt along its side opposite said one side; and
said second series of vanes being spaced from the first series by at least the width of said belt.
5. The structure of claim 4, in which
said frame has spaced apart side areas; and
said vanes each has a length extending from said belt onto said areas whereby the vanes of the two series are maintained at a fixed spaced apart distance at their soil contacting ends.
6. The structure of claim 4, in which
said vanes are each spaced apart one from the other in each series; and
the vanes in one series are spaced along said belt in offset relation to the vanes in the second set, whereby the spacing apart of adjacent vanes in one series is intermediate in position of the area of a vane in the other series.
7. The structure of claim 6, in which
the vanes in the second series extend from said belt approximately the same distance as do the vanes in the first series to have the second series vanes contact the ground as well as the first series vanes.

References Cited by the Examiner
UNITED STATES PATENTS

| | | | |
|---|---|---|---|
| 917,912 | 4/1909 | Tuttle | 172—509 |
| 1,357,092 | 10/1920 | Humphrey | 172—512 |

ABRAHAM G. STONE, *Primary Examiner.*

WILLIAM A. SMITH III, *Examiner.*